(12) United States Patent
Jeon

(10) Patent No.: US 7,274,159 B2
(45) Date of Patent: Sep. 25, 2007

(54) BACKLIGHT FOR A DISPLAY DEVICE

(75) Inventor: Jin-Hwan Jeon, Gyeonggi-Do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 170 days.

(21) Appl. No.: 11/168,327

(22) Filed: Jun. 29, 2005

(65) Prior Publication Data

US 2006/0146567 A1    Jul. 6, 2006

(30) Foreign Application Priority Data

Dec. 31, 2004  (KR)  .................... 10-2004-0118460

(51) Int. Cl.
*G05F 1/00* (2006.01)
(52) U.S. Cl. ...................... 315/307; 315/291
(58) Field of Classification Search ............ 315/200 R, 315/201, 246, 250, 255, 277, 283, 291, 307, 315/308
See application file for complete search history.

(56) References Cited

U.S. PATENT DOCUMENTS

| | | | | |
|---|---|---|---|---|
| 6,072,283 A * | 6/2000 | Hedrei et al. | ............... | 315/307 |
| 6,316,886 B1 * | 11/2001 | Luger et al. | ................ | 315/307 |
| 7,042,171 B1 * | 5/2006 | Lin | ............................ | 315/291 |
| 2003/0107332 A1 * | 6/2003 | Newman et al. | ............ | 315/307 |
| 2003/0122506 A1 * | 7/2003 | Kamata et al. | ............. | 315/291 |
| 2004/0145584 A1 * | 7/2004 | Lee et al. | .................... | 345/212 |
| 2004/0183465 A1 * | 9/2004 | Jang | ........................... | 315/224 |
| 2004/0246226 A1 * | 12/2004 | Moon | ......................... | 345/102 |
| 2005/0093482 A1 * | 5/2005 | Ball | ............................ | 315/277 |
| 2005/0093483 A1 * | 5/2005 | Ball | ............................ | 315/291 |
| 2007/0013322 A1 * | 1/2007 | Tripathi et al. | ............. | 315/291 |

\* cited by examiner

*Primary Examiner*—Tung X Le
*Assistant Examiner*—Trinh Dinh
(74) *Attorney, Agent, or Firm*—Morgan, Lewis & Bockius LLP

(57) ABSTRACT

A backlight comprising a plurality of lamps, an A/D converter connected to the lamps in parallel to convert an inputted alternating current into a direct current and to provide the converted direct current to the lamps, a current measuring unit connected to the lamps in parallel to measure currents outputted from the lamps, and a controlling unit to control a current value to be applied to the lamps according to a current value inputted from the current measuring unit.

12 Claims, 2 Drawing Sheets

BACKLIGHT FOR A DISPLAY DEVICE

The present invention claims the benefit of Korean Patent Application No. 2004-118460 filed in Korea on Dec. 31, 2004, which is hereby incorporated by reference.

BACKGROUND OF THE INVENTION

1. Field of the Invention

The present invention relates to a backlight for a display device, and more particularly, to a backlight for a liquid crystal display (LCD) device.

2. Discussion of the Related Art

In recent days, there has been an increase in demand for flat panel display devices having thin, light weight, and small profiles for applications in portable electronic devices, such as mobile phones, personal digital assistants (PDAs), and notebook computers. Examples of these flat panel display devices include liquid crystal display (LCD) devices, plasma display panels (PDPs), field emission displays (FEDs), vacuum fluorescent displays (VFDs), and the like. Among the flat panel display devices, the LCD device is the most popular due to mass productions of the device, relatively simple method for driving these devices, and high picture quality.

The LCD device displays a desired image on a screen by controlling an amount of light passing through a liquid crystal layer due to refraction anisotropy of the liquid crystal molecules. Accordingly, a backlight, which act as a light source that emits light through the liquid crystal layer, is installed in the LCD device for an image display. Backlights are generally classified into two categories: (1) an edge-type and (2) a direct-type. An edge-type backlight has a light source installed along a side surface of a liquid crystal panel to provide light to the liquid crystal layer. A direct-type backlight has a light source installed at a lower portion of the liquid crystal panel to directly provide light to the liquid crystal layer.

The edge-type backlight is installed at a side surface of a liquid crystal panel and provides light to the liquid crystal layer through a light guide plate and a reflector. Since the edge-type backlights are slim, they are mainly used in systems requiring thin display devices, such as notebook computers and the like. However, since the edge type backlights are positioned at a side surface of a liquid crystal panel, it is difficult to provide uniform light to a large area. Further, because the light is provided to the liquid crystal layer through a light guide plate, edge-type backlights have difficulty providing lighting with high brightness. Accordingly, the edge-type backlight is not suitable for large liquid crystal panels, such as large LCD televisions being recently marketed.

On the other hand, the direct-type backlights emit light directly to the LCD panel from a lamp of lamps, thereby being adapted to be applied to large liquid crystal panels. Further, since the direct-type backlight provides lighting with high brightness, it is mainly used with liquid crystal panels for LCD televisions.

FIG. 1 shows an LCD device to which a direct-type backlight is applied in accordance with the related art. As shown in FIG. 1, an LCD device 1 includes a liquid crystal display panel 3, and a backlight 10 installed at a rear surface of the liquid crystal panel 3. The liquid crystal panel 3 for displaying an image includes a transparent lower substrate 3a, such as a glass, an upper substrate 3b, and a liquid crystal layer (not shown) formed therebetween. Although not shown, the lower substrate 3a is a thin film transistor substrate having formed thereon driving devices such as thin film transistors (TFTs) and pixel electrodes. The upper substrate 3b is a color filter substrate having a color filter layer formed thereon. Also, a driving circuit unit 5 for respectively applying signals to the thin film transistors and the pixel electrodes is formed at a side of the lower substrate 3a. The backlight 10 includes a plurality of lamps 11 for emitting light and supplying the light to the liquid crystal panel 3, a reflector 17 for reflecting light emitted from the lamps 11 and enhancing an optical efficiency, and an optical sheet 15 for diffusing light emitted from the lamps 11 and directing the light to be incident on the liquid crystal panel 3.

FIG. 2 is a block diagram schematically showing a circuit structure of the backlight 10 according to a related art. As shown, the lamps 11 are provided with transformers T1 at both ends thereof. The transformer T1 is connected to an A/D converter 22, such as a bridge circuit. An alternating current inputted from an input voltage (Vin) terminal is converted into a direct current by the A/D converter 22 and is applied to the transformer T1. Then, a controlled voltage of the current applied to the transformer T1 is applied to both ends of each lamp 11.

The A/D converter 22 is connected to a controlling unit 20 and converts an alternating current into a direct current according to a control signal supplied from the controlling unit 20. A current outputted from the lamps 11 is inputted to the controlling unit 20 as a feedback signal. The controlling unit 20 compares the inputted current with a preset current. The controlling unit 20 compensates the inputted current based on the comparison and then supplies the compensated current to the lamps 11.

However, as shown in FIG. 2, the plural controlling units 20 and the A/D converters 22 are respectively connected to two lamps 11. That is, in the related art backlight, the current supplied to the lamps 11 are fed back to each individual controlling unit 20 to individually drive the pair of lamps 11. Accordingly, the current individually supplied to each pair of lamps 11 may be different from each other, thereby causing difference in brightness of the emitted light. The difference in brightness reduces picture quality when driving an LCD device.

SUMMARY OF THE INVENTION

Accordingly, the present invention is directed to a backlight that substantially obviates one or more of the problems due to limitations and disadvantages of the related art.

An object of the present invention is to provide a backlight capable of preventing a difference in brightness of the lamps by always supplying substantially the same current to the lamps by controlling the lamps as a whole.

Another object of the present invention is to provide of a liquid crystal display (LCD) device capable of preventing picture quality degradation due to a difference in brightness of the lamps by providing the backlight.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a backlight includes a plurality of lamps, an A/D converter connected to the lamps in parallel to convert an inputted alternating current into a direct current and to provide the converted direct current to the lamps, a current measuring unit connected to the lamps in parallel to measure currents outputted from the lamps, and a controlling unit to control a current value to be applied to the lamps according to a current value inputted from the current measuring unit.

In another aspect, a liquid crystal display device (LCD) includes a liquid crystal panel having a plurality of pixels and displaying an image, a plurality of lamps for providing light to the liquid crystal panel, an A/D converter connected to the lamps in parallel to convert an inputted alternating current into a direct current and to provide the converted direct current to the lamps, a current measuring unit connected to the lamps in parallel to measure currents outputted from the lamps, and a controlling unit to control a current value to be applied to the lamps according to a current value inputted from the current measuring unit.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings. The present invention provides a liquid crystal display (LCD) device capable of preventing degradation of picture quality by driving the lamps as a whole and not individually driving the lamps. In an exemplary embodiment of the present invention, a current is supplied to the plural lamps in parallel by one controlling unit. An outputted current from the lamps is fed back to the controlling unit, thereby integrally controlling the lamps. As the plural lamps are controlled in their entirety, substantially the same current is applied to each lamp, and thus each lamp has substantially the same brightness to thereby enhance the picture quality of the LCD device. Hereinafter, a backlight of the LCD device according to the present invention will be explained in more detail with reference to the drawings.

Figure 1:
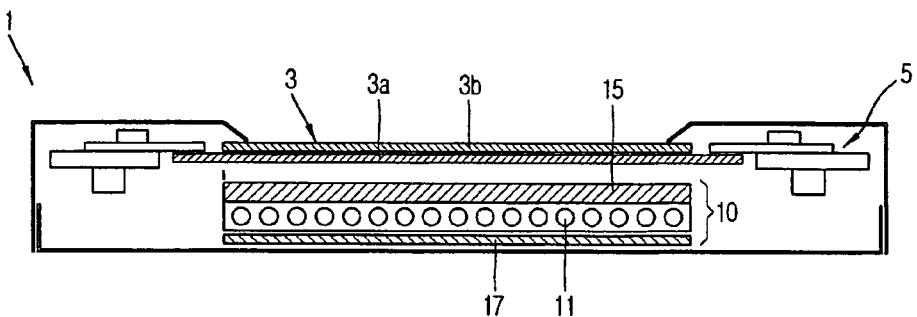
FIG. 1 is a view showing an LCD device to which a direct type backlight is applied in accordance with the related art.
Figure 2:
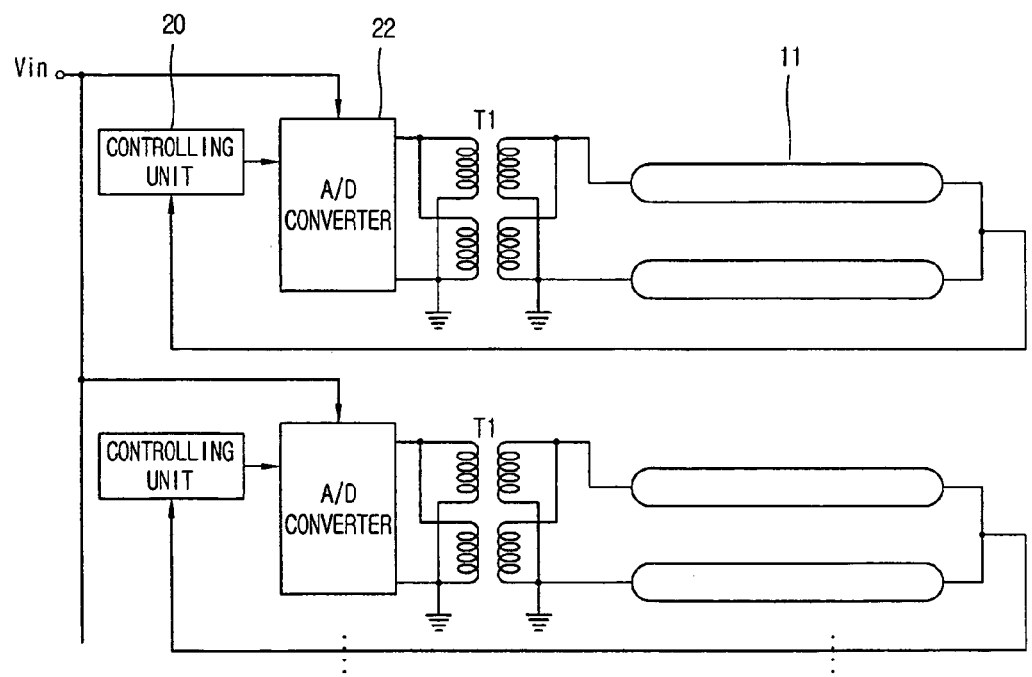
FIG. 2 is a view showing a circuit structure of a backlight in accordance with the related art.
Figure 3:
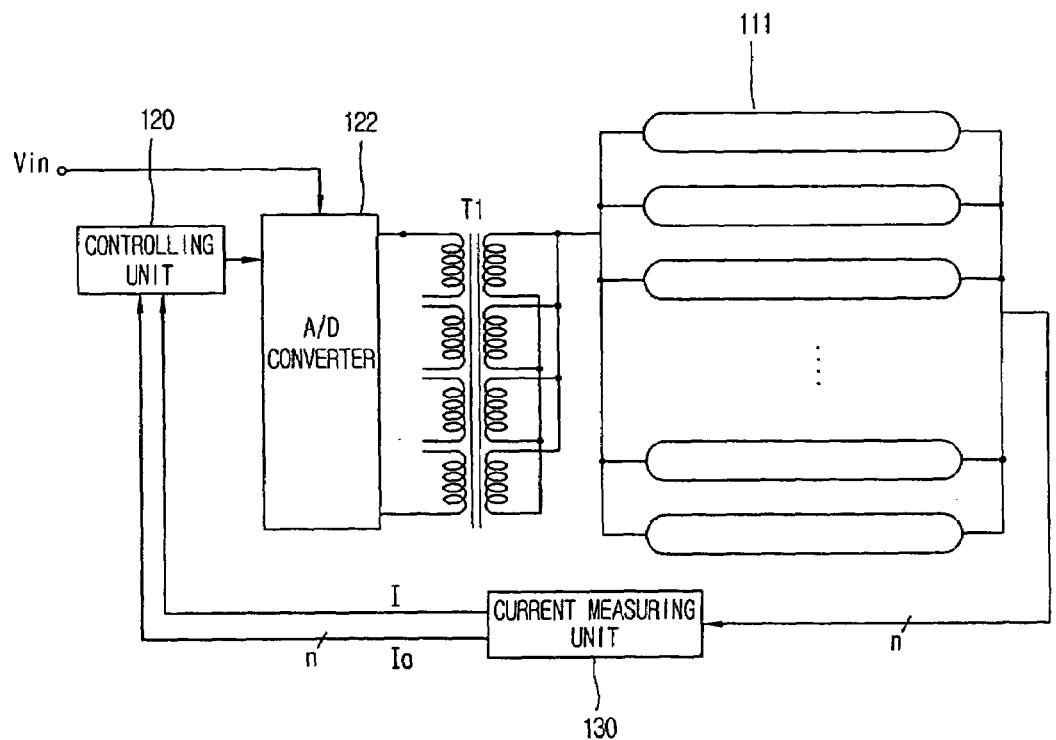
FIG. 3 is a view showing a circuit structure of a backlight according to an exemplary embodiment of the present invention.

FIG. 3 is a view showing a circuit structure of a backlight according to an exemplary embodiment the present invention. As shown, plurality of lamps 111 for providing light to a liquid crystal panel are connected to one another in parallel. The lamps 111 may be a cold cathode fluorescent lamp (CCFL) or an external electrode fluorescent lamp (EEFL). However, various lamps of other types may be used.

A transformer T1 is connected to the lamps 111 in parallel, and the transformer T1 is connected to an A/D converter 122. An alternating current inputted from an input power source (Vin) is converted into a direct current by the A/D converter 122 and is applied to the transformer T1. Then, the converted voltage is applied to the lamps 111 in parallel. That is, as the direct current is distributed to the plural lamps 111, the same current is applied to each lamp 111. Accordingly, the transformer T1 of an input side boosts an inputted current into a high voltage to be distributed to each lamp 111.

Figure 4:
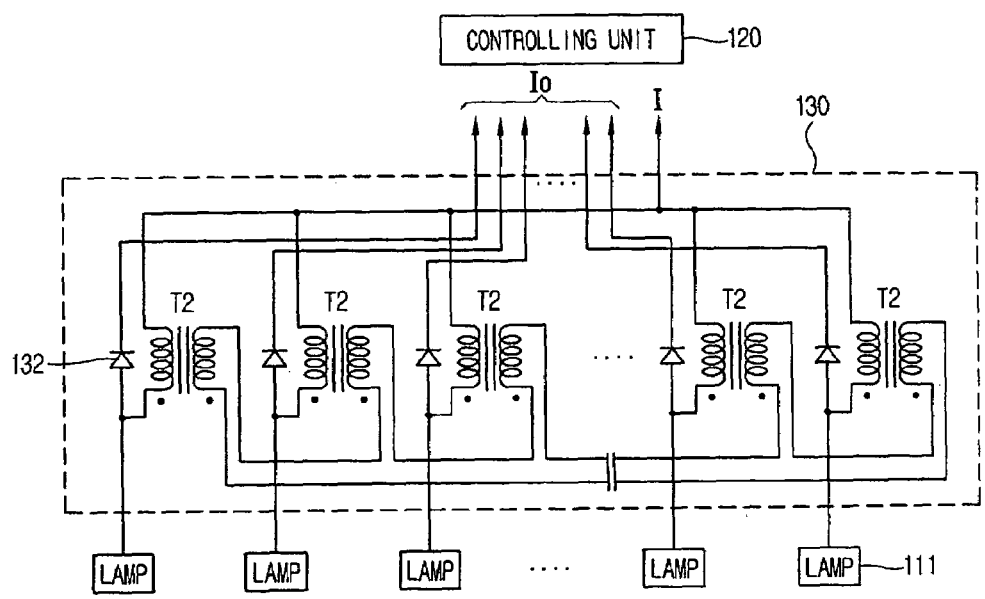
FIG. 4 is a view showing a current measuring unit in FIG. 3 according to an exemplary embodiment of the present invention.

The A/D converter 122 is connected to a controlling unit 120. The controlling unit 120 determines whether to apply a current to the lamps 111, and outputs a control signal to the A/D converter 122 to convert an alternating current into a direct current and to apply the direct current to the lamps 111. A current outputted from the lamps 111 is inputted into the current measuring unit 130. As shown in FIG. 4, the current measuring unit 130 is provided with transformers T2 connected to each lamp 111. Each of the transformers T2 are connected to each of the lamps 111 in parallel for leveling currents inputted from the lamps, so that a total current I obtained by adding the currents passing through each of the transformers T2 is fed back to the controlling unit 120. The controlling unit 120 compares the inputted total current I with a preset current. When there is an error after the comparison, the controlling unit 120 compensates the inputted total current to supply to the lamps 111.

Input terminals of the lamps 111 are driven in parallel and are provided with a high voltage. Also, the current outputted from all of the lamps 111 is measured by the current measuring unit 130 to be applied to the controlling unit 120. Accordingly, the lamps 111 are controlled together in their entirety, thereby preventing a degradation of picture quality due to a difference in brightness of the lamps 111.

The current measuring unit 130 is provided with a plurality of diodes 132 connected in parallel to the transformers T2 to pass currents outputted from the respective lamps 111. The diodes 132 connected to each of the output terminals of the lamps 111 are respectively connected individually to the controlling unit 120, and over-currents (Io) outputted from the lamps 111 are inputted serially into the controlling unit 120. The diodes 132 on which the over-currents (Io) flow are connected to the controlling unit 120 individually for the following reasons.

The over-currents (Io) are detected to judge whether the lamps 111 are operating normally or not. If it is judged that the lamps 111 are abnormal, a current is not supplied to the lamps 111 to prevent damage to the lamps 111. The abnormal state of each lamp 111 is detected individually and not as a whole. Accordingly, if the diodes through which the over-currents (Io) flow are connected to one another in parallel, it is difficult to detect the abnormal state of the lamps 111 when only one lamp is operating abnormally since a ratio of the over-current (Io) is less than that of the entire current. Therefore, the over-current (Io) is fed back individually to the controlling unit 120 to detect an abnormal state of each lamp 111.

As discussed above, in the present invention, the plural lamps are controlled as a whole and thus the same current is supplied to all the lamps at one time, thereby preventing a brightness difference of the lamps. Accordingly, degradation of picture quality due to a partial brightness difference of the LCD device can be substantially prevented. Also, in the present invention, over-currents outputted from each lamp are detected individually to thereby effectively prevent degradation of picture quality due to an abnormal state of each lamp.

It will be apparent to those skilled in the art that various modifications and variations can be made in the back light of the present invention without departing from the spirit or scope of the invention. Thus, it is intended that the present invention cover the modifications and variations of this invention provided they come within the scope of the appended claims and their equivalents.

What is claimed is:

1. A backlight comprising:
   a plurality of lamps;
   an A/D converter connected to the lamps in parallel to convert an inputted alternating current into a direct current and to provide the converted direct current to the lamps;
   a current measuring unit connected to the lamps in parallel to measure currents outputted from the lamps, the current measuring unit including a plurality of transformers connected to each lamp for leveling currents inputted from the lamps; and
   a controlling unit to control a current value to be applied to the lamps according to a current value inputted from the current measuring unit.

2. The backlight of claim 1, further comprising a boost transformer to boost a current converted by the A/D converter to be applied to the lamps.

3. The backlight of claim 1, wherein the current outputted from the plurality of transformers is inputted to the controlling unit in parallel.

4. The backlight of claim 1, wherein the current measuring unit further includes a plurality of diodes each connected to a respective one of the lamps and passing over-currents outputted from the lamps.

5. The backlight of claim 4, wherein the over-current is serially inputted to the controlling unit.

6. The backlight of claim 1, wherein the lamps include one of a cold cathode fluorescent lamp (CCFL) and an external electrode fluorescent lamp (EEFL).

7. A liquid crystal display device comprising:
   a liquid crystal panel having a plurality of pixels and displaying an image;
   a plurality of lamps for providing light to the liquid crystal panel;
   an A/D converter connected to the lamps in parallel to convert an inputted alternating current into a direct current and to provide the converted direct current to the lamps;
   a current measuring unit connected to the lamps in parallel to measure currents outputted from the lamps, the current measuring unit includes a plurality of transformers connected to each lamp for leveling currents inputted from the lamps; and
   a controlling unit to control a current value to be applied to the lamps according to a current value inputted from the current measuring unit.

8. The liquid crystal display device of claim 7, further comprising a boost transformer to boost a current converted by the A/D converter to be applied to the lamps.

9. The liquid crystal display device of claim 7, wherein the current outputted from the plurality of transformers is inputted to the controlling unit in parallel.

10. The liquid crystal display device of claim 7, wherein the current measuring unit further includes a plurality of diodes each connected to a respective one of the lamps and passing over-currents outputted from the lamps.

11. The liquid crystal display device of claim 10, wherein the over-current is serially inputted to the controlling unit.

12. The liquid crystal display device of claim 7, wherein the lamps include one of a cold cathode fluorescent lamp (CCFL) and an external electrode fluorescent lamp (EEFL).

* * * * *